United States Patent [19]
Akiyama et al.

[11] Patent Number: 5,810,912
[45] Date of Patent: Sep. 22, 1998

[54] COMPOSITE HOLLOW FILAMENTARY FILM OF POROUS CERAMICS AND PROCESS FOR PRODUCING THE SAME

[76] Inventors: Shigeo Akiyama, 2-12-9-305, Amakubo, Tsukuba city, Ibaraki; Hiroshi Anzai, 5-8-5, Kugenumakaigan, Fujisawa city, Kanagawa; Shigeharu Morooka, 3-29-2, Miwadai, Higashi-ku, Fukuoka city, Fukuoka; Katsuki Kusakabe, 6-1-435, Chihaya, Higashi-ku, Fukuoka city, Fukuoka; Jun-ichiro Hayashi, 4-15-1, Miwadai, Higashi-ku, Fukuoka city, Fukuoka; Masatake Yamamoto, 2-11-5-407, Baikoen, Chuoh-ku, Fukuoka city, Fukuoka, all of Japan

[21] Appl. No.: 641,943

[22] Filed: May 2, 1996

[51] Int. Cl.⁶ ............... B01D 69/12; B01D 71/02
[52] U.S. Cl. ............... 96/11; 55/524; 55/DIG. 5; 427/228
[58] Field of Search ............... 96/4, 8, 10–14; 55/52, 524, 527, DIG. 5; 427/228, 372.2, 384, 385.5, 388.2, 409, 435

[56] References Cited

U.S. PATENT DOCUMENTS

| | | | |
|---|---|---|---|
| 3,511,031 | 5/1970 | Ketteringham et al. | 96/8 |
| 4,329,157 | 5/1982 | Dobo et al. | 96/8 X |
| 4,440,643 | 4/1984 | Makino et al. | 96/10 X |
| 4,474,662 | 10/1984 | Makino et al. | 96/13 X |
| 4,528,004 | 7/1985 | Makino et al. | 96/13 |
| 4,685,940 | 8/1987 | Soffer et al. | 96/8 |
| 5,104,425 | 4/1992 | Rao et al. | 96/11 X |
| 5,431,864 | 7/1995 | Rao et al. | 96/11 X |

FOREIGN PATENT DOCUMENTS

| | | | |
|---|---|---|---|
| 3-161030 | 7/1991 | Japan | 96/12 |

*Primary Examiner*—Robert Spitzer
*Attorney, Agent, or Firm*—Barnes & Thornburg

[57] ABSTRACT

A composite porous ceramic hollow fiber obtained by dipping a porous ceramic hollow fiber into a carbon precursor-forming solution, picking up and drying the dipped porous ceramic hollow fiber, heating the thus deposited carbon precursor-forming film, thereby obtaining a carbon precursor thin film, and heating the carbon precursor thin film at a carbon precursor thermal decomposition temperature, thereby forming a carbon thin film on the porous ceramic hollow fiber has a permeance about 100 to about 1,000 times as high as that of an organic thin film and a separation coefficient as high as that of the organic thin film.

5 Claims, 2 Drawing Sheets

COMPOSITE HOLLOW FILAMENTARY FILM OF POROUS CERAMICS AND PROCESS FOR PRODUCING THE SAME

BACKGROUND OF THE INVENTION

1. Field of the Invention

The present invention relates to composite hollow porous ceramic fiber and a process for producing the same and more particularly to a composite porous ceramic fiber suitable for use as a gas separation membrane having a distinguished permeance and a process for producing the same.

2. Related Prior Art

Porous ceramic hollow fibers have distinguished heat resistance, chemical stability, etc. and their application to gas separation membranes exposed to a particularly high temperature is highly expectable. So far, a number of process for producing the film, for example, by a phase separation method, a sol-gel method, a CVD method, a hydrothermal synthesis method, an electrolytic oxidation method, etc. have been proposed. However, only $SiO_2$ films produced by the sol-gel method or by the CVD method using silanes or chlorides have a high gas separability.

Though the $SiO_2$ films as $CO_2$ separation membranes have a relatively high $CO_2$ permeance, for example, in the order of $10^{-9}$ mol./m²·sec·Pa, their separation coefficient α is on a lower level than 10 in both cases of $CO_2/CH_4$ and $CO_2/N_2$.

On the other hand, organic thin films have a relatively high separation coefficient, for example, 30 to 60 in case of $CO_2/CH_4$ and 15 to 30 in case of $CO_2/N_2$, but their $CO_2$ permeance is in the order of $10^{-10}$ to $10^{-12}$ mol./m²·sec·Pa. Thus, further improvement has been desired.

SUMMARY OF THE INVENTION

An object of the present invention is to provide a composite porous ceramic hollow fiber effectively applicable as a gas separation membrane having a separation coefficient as high as that of an organic thin film and a high permeance.

Another object of the present invention is to provide a process for producing such a composite porous hollow fiber.

DETAILED DESCRIPTION OF THE INVENTION

According to the present invention, there is provided a composite porous ceramic hollow fiber, which comprises a porous ceramic hollow fiber and a carbon thin film provided on the surface of the porous ceramic hollow fiber.

The present composite porous ceramic hollow fiber is produced by dipping a porous ceramic hollow fiber into a carbon precursor-forming solution, picking up and drying the dipped porous ceramic hollow fiber, heating the thus deposited carbon precursor-forming film, thereby obtaining a carbon precursor thin film, and heating the carbon precursor thin film at a carbon precursor thermal decomposition temperature, thereby forming a carbon thin film on the porous ceramic hollow fiber.

The porous ceramic hollow fiber for use in the present invention can be obtained usually by spinning a polymer solution containing particles of $Al_2O_3$, $Y_2O_3$, MgO, $SiO_2$, $Si_3N_4$, $ZrO_2$, etc. in a dispersed state in an organic solvent by dry and wet process into hollow filaments and then calcining the resulting filaments, and has such ultra-filtration requirements as an average porosity of about 20 to about 60%, preferably about 40 to about 60%, and an average pore size of about 10 to about 5,000 nm, preferably about 50 to about 500 nm.

Formation of a carbon thin film onto the surface of such a porous ceramic hollow fiber can be carried out by dipping a porous ceramic hollow fiber into a carbon precursor-forming solution, picking up and drying the dipped porous ceramic hollow fiber, heating the thus deposited carbon precursor-forming film, thereby obtaining a carbon precursor thin film, and heating the carbon precursor thin film at a carbon precursor thermal decomposition temperature, thereby forming a carbon thin film on the porous ceramic hollow fiber.

The carbon precursor thin film for use in the present invention is not particularly limited, so long as it can be formed into a carbon thin film by heating it at a carbon precursor decomposition temperature, but it is rather preferable that the carbon precursor thin film itself has a good selective permeability for a specific gas. In the formation of such a carbon precursor thin film, polyamic acid, etc. can be used. Specific examples of the polyamic acid include, for example, a polyamic acid obtained by reaction of 3,3',4,4'-biphenyltetracarboxylic acid dianhydride (BPDA) with 4,4'-oxydianiline (ODA), that is, more specifically a polyamic acid solution formed, for example, by separately preparing their respective slurries or solutions in N,N'-dimethylacetamide, and dropwise adding an equimolar amount of the slurry or solution of BPDA to the slurry or solution of ODA. Then, a porous ceramic hollow fiber is dipped into the polyamic acid solution as a carbon precursor-forming solution, picking up and drying the dipped porous ceramic hollow fiber, thereby depositing the polyamic acid film thereon as a carbon precursor-forming thin film thereon, and heat treating the carbon precursor-forming thin film to polyimidize the thin film, thereby forming a carbon precursor thin film.

In case of forming such a carbon precursor thin film on the outside surface of a porous ceramic hollow fiber from the polyamic acid solution, a hollow filamentary film, whose one end has been sealed with a silicone tube or the like in advance, is dipped into the polyamic acid solution, picked up and subjected to natural drying in stationary air without air movement for about 12 to about 24 hours and then to heat treatment at a temperature of about 100° to about 300° C. in an inert gas atmosphere such as a nitrogen gas atmosphere or the like to remove the remaining solvent therefrom and conduct polyimidization reaction with dehydration and ring closure, thereby converting the polyamic acid on the outer surface of the hollow filamentary film to polyimide and forming a polyimide thin film as a carbon precursor thin film thereon. Such a series of the above-mentioned operations must be repeatedly carried out until the formed polyimide thin film becomes pinhole-free.

Reaction to form polyamic acid from BPDA and ODA at room temperature and polyimidization reaction with heating at a temperature of about 100° to about 300° C. proceed, for example, as shown below:

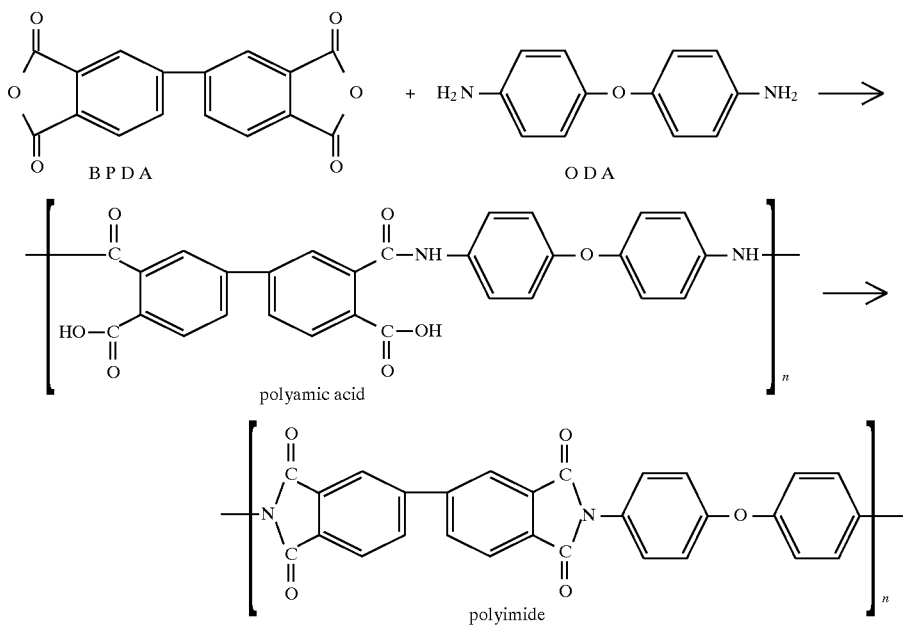

Other acid anhydride component for forming the polyamic acid includes, for example, aromatic carboxylic acid dianhydrides such as pyromellitic acid dianhydride, benzo-phenonetetracarboxylic acid dianhydride, hexafluoro-isopropylidenediphthalic acid dianhydride, etc., and other diamine component includes aromatic diamines such as p-phenylenediamine, benzophenonediamine, 2,4,6-trimethyl-1,3-phenylenediamine, methylenedianiline, isopropylidenedianiline, etc. These acid anhydride components and the diamine components can be used in various desired combinations, respectively.

The pinhole-free polyimide thin film formed on the porous ceramic hollow fiber is subjected to heat treatment at a temperature of about 500° to about 1,500° C., preferably about 500 to about 900V under an inert gas atmosphere, such as a nitrogen gas atmosphere, etc. to carbonize the polyimide thin film, whereby a composite porous ceramic hollow fiber provided with a carbon thin film on the surface of the porous ceramic hollow fiber can be obtained.

In the present invention, the most constricted carbonized pores can be formed in the carbonized thin film, even if the carbonized thin film-forming temperature is set to a relatively broad range of about 500° to about 1,500° C., preferably about 500° to about 900° C., and thus a composite porous ceramic hollow fiber with a carbon thin film thereon, which has a permeance about 100 to about 1,000 times as high as that of an organic thin film and a separation coefficient as high as that of the organic thin film and is suitable for use as a gas separation membrane, can be obtained.

PREFERRED EMBODIMENTS OF THE INVENTION

The present invention will be described in detail below, referring to Example.

EXAMPLE 15 ml of N,N'-dimethylacetamide dried in advance by distillation with calcium hydride was added to 3.106 g (15.5 millimoles) of 4,4'-oxydianiline, followed by stirring at 15° C. Separately, 10 ml of N,N'-dimethylacetamide was added to 4.564 g (15.5 millimoles) of 3,3',4,4'-biphenyltetracarboxylic acid dianhydride to prepare a slurry, and the slurry was dropwise added to the 4,4'-oxydianiline solution portions by portions after the 4,4'-oxydianiline had been dissolved in the N,N'-dimethylacetamide. After the 3,3',4,4'-biphenyltetracarboxylic acid dianhydride remaining on the vessel wall had been washed off with 30 ml of N,N'-dimethylacetamide, the mixture was stirred at 15° C. for one hour and further at 25V for 3 hours to obtain a polyamic acid solution (concentration: 14.8% by weight).

A porous α-alumina hollow fiber (outer diameter: 2.4 mm, inner diameter: 1.8 mm, porosity: about 40%, average pore size: 150 nm) was sealed at one end by inserting a silicone tube, whose other end was sealed by a clip, into it and dipped into the polyamic acid solution at 15° C. for 5 minutes, and then picked up at a pick up speed of about 8 mm/sec. The dipped hollow fiber was dried in air at 15° C. for 24 hours and subjected to multistage heat treatment at a temperature elevation speed of 2.5° C./min. by keeping it at 60° C., 100°

C. and 200° C. each for 30 minutes and further at 300° C. for 3 hours to polyimidize the polyamic acid and then left standing for natural cooling. Such operations were repeated three times, whereby a composite hollow fiber comprising the porous α-alumina hollow fiber and a 3,3',4,4'-biphenyltetracarboxylic acid dianhydride-4,4'-oxydianiline polyimide film free from pinholes (comfirmed by observing no nitrogen gas permeation in a gas permeation test) formed on the surface of the hollow fiber was obtained.

Figure 1:
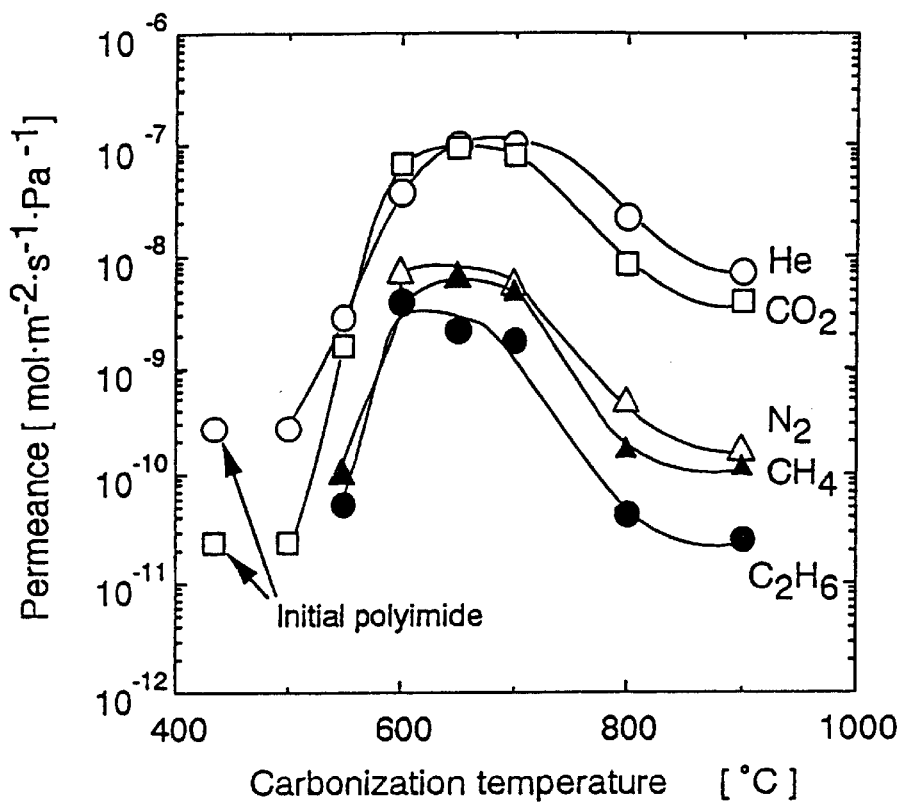
FIG. 1 is a graph showing relations between carbonization temperatures for producing a porous α-alumina hollow tubes with a carbon thin film thereon and permeances of various gases through the composite hollow fiber.
Figure 2:
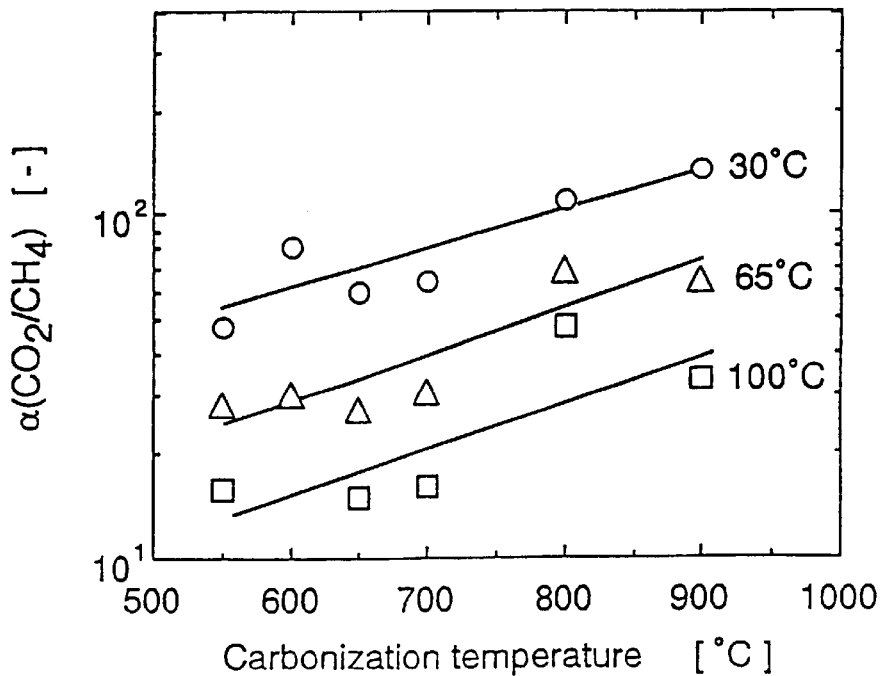
FIG. 2 is a graph showing relations between carbonization temperatures for producing a composite porous α-alumina hollow fiber with a carbon thin film thereon and separation coefficient a ($CO_2/CH_4$) of the composite hollow filamentary film.
Figure 3:
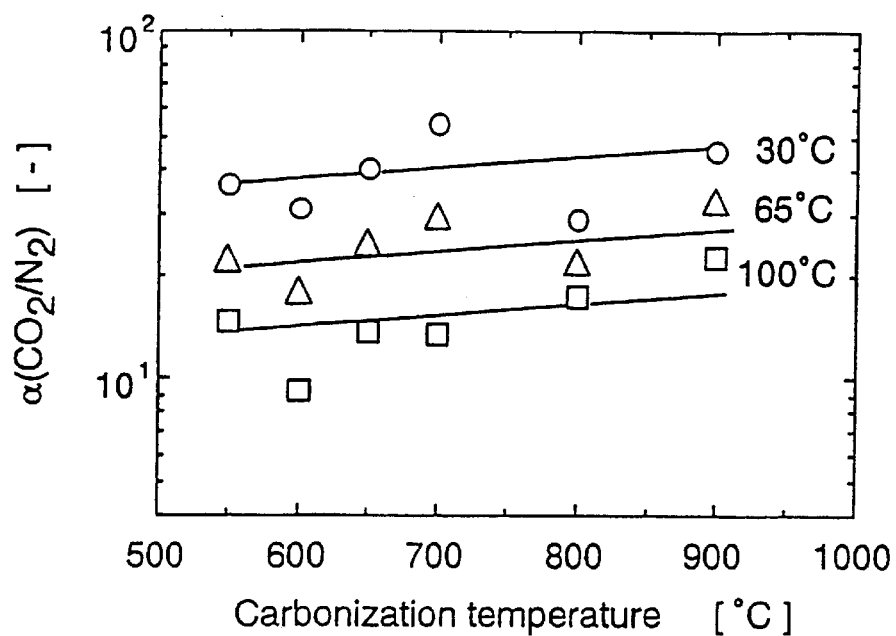
FIG. 3 is a graph showing relations between carbonization temperatures for producing a composite porous α-alumina hollow fiber with a carbon thin film thereon and separation coefficient α ($CO_2/N_2$) of the composite hollow fiber.
Figure 4:
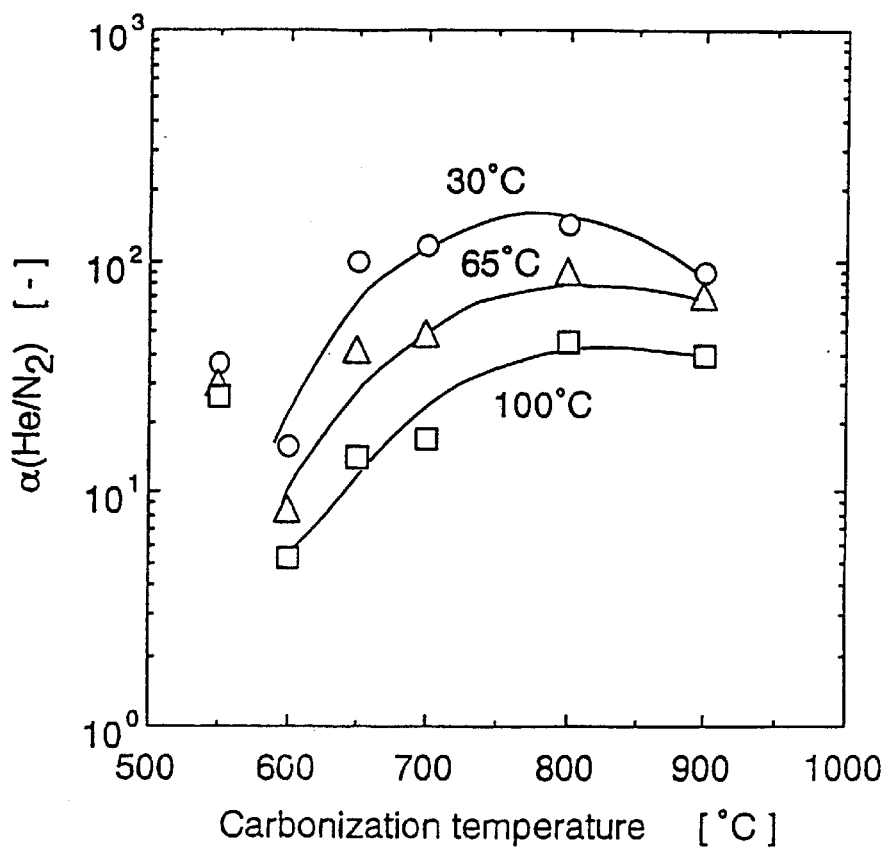
FIG. 4 is a graph showing relations between carbonization temperatures for producing a composite porous α-alumina hollow fiber with a carbon thin film thereon and separation coefficient α ($He/N_2$) of the composite hollow fiber.

The thus obtained composite hollow fiber with the polyimide film was heat treated in a temperature range of 500° to 900° C. at a temperature elevation speed of 5 ° C./min. in a nitrogen gas stream to obtain a composite porous α-alumina hollow fiber with a carbon thin film on the surface of the hollow fiber. Relations between carbonization temperatures for producing the composite of porous α-alumina hollow fiber with the carbon thin film on the surface of the hollow fiber and permeances of various gases, i.e. He, $CO_2$, $N_2$, $CH_4$ and $C_2H_5$ through the composite hollow fiber are shown in FIG. 1, and relations between the carbonization temperatures and separation coefficients α ($CO_2/CH_4$, $CO_2/N_2$ and $He/N_2$) are shown in FIGS. 2, 3 and 4, respectively.

It is apparent from these results that the present composite porous α-alumina hollow fiber with a carbon thin film on the surface of the hollow fiber had a permeance about 100 to about 1,000 times as high as that of an organic thin film such as a polyimide thin film, etc. and a separation coefficient as high as that of the organic thin film.

What is claimed is:

1. A process for producing a composite porous ceramic hollow fiber, which comprises:

dipping a porous ceramic hollow fiber into a polyamic acid solution;

removing the porous ceramic hollow fiber from the polyamic acid solution and drying the dipped porous ceramic hollow fiber to produce a deposited film from the polyamic acid solution;

heating the porous ceramic hollow fiber and deposited film to form a polyimide thin film on the porous ceramic hollow fiber; and heating the polyimide thin film at a temperature sufficient to cause thermal decomposition thereof, thereby forming a carbon thin film on the porous ceramic hollow fiber.

2. A process according to claim 1, wherein the polyamic acid is a reaction product of aromatic carboxylic acid dianhydride and aromatic diamine.

3. A process according to claim 1, wherein the polyimide film is imperforate.

4. A process according to claim 1, wherein the polyimide film is heated in an inert gas atmosphere at a temperature of about 500° C. to about 1,500° C. to effect the thermal decomposition.

5. A process according to claim 1, wherein the polyimide film is heated in an inert gas atmosphere at a temperature of about 500° C. to about 900° C. to effect the thermal decomposition.

* * * * *